(12) United States Patent
Benhase et al.

(10) Patent No.: US 8,433,870 B2
(45) Date of Patent: *Apr. 30, 2013

(54) MULTIPLE INCREMENTAL VIRTUAL COPIES

(75) Inventors: Michael T. Benhase, Tucson, AZ (US);
Theresa M. Brown, Tucson, AZ (US);
Lokesh M. Gupta, Tucson, AZ (US);
Rivka M. Matosevich, Zichron-Ya'acov (IL); Carol S. Mellgren, Tucson, AZ (US); Gail A. Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/902,934

(22) Filed: Oct. 12, 2010

(65) Prior Publication Data

US 2012/0089795 A1 Apr. 12, 2012

(51) Int. Cl.
*G06F 12/16* (2006.01)
*G06F 17/30* (2006.01)

(52) U.S. Cl.
USPC .......................................... 711/162; 707/646

(58) Field of Classification Search .................. None
See application file for complete search history.

(56) References Cited

U.S. PATENT DOCUMENTS

| | | | |
|---|---|---|---|
| 6,611,901 B1 | 8/2003 | Micka et al. | |
| 6,996,586 B2 | 2/2006 | Stanley et al. | |
| 7,000,145 B2 | 2/2006 | Werner et al. | |
| 7,024,530 B2 | 4/2006 | Jarvis et al. | |
| 7,047,378 B2 | 5/2006 | Factor et al. | |
| 7,047,390 B2 | 5/2006 | Factor et al. | |
| 7,136,974 B2 | 11/2006 | Burton et al. | |
| 7,278,049 B2 | 10/2007 | Bartfai et al. | |
| 8,041,911 B2 * | 10/2011 | Matsui ........................ | 711/162 |
| 2004/0186968 A1 | 9/2004 | Factor et al. | |
| 2004/0260897 A1 | 12/2004 | Sanchez et al. | |
| 2004/0260898 A1 | 12/2004 | Stanley et al. | |
| 2005/0278391 A1 | 12/2005 | Spear et al. | |

OTHER PUBLICATIONS

PCT International Search Report and Written Opinion dated Feb. 28, 2012 for Application No. PCT/EP2011/067227 filed Oct. 3, 2011 for IBM Corporation, 12 pp.
U.S. Appl. No. 13/467,530, filed on May 9, 2012, entitled "Multiple Incremental Virtual Copies" by inventors M.T. Benhase, T.M. Brown, L.M. Gupta, R.M. Matosevich, C.S. Mellgren and G.A. Spear (18.362C1), 46 pp.

(Continued)

*Primary Examiner* — Gary Portka
(74) *Attorney, Agent, or Firm* — Janaki K. Davda; Konrad Raynes Davda & Victor LLP

(57) ABSTRACT

Provided are techniques for, in response to establishing each incremental virtual copy from a source to a target, creating a target change recording structure for the target. While performing destage to a source data block at the source, it is determined that there is at least one incremental virtual copy target for this source data block. For each incremental virtual copy relationship where the source data block is newer than the incremental virtual copy relationship and an indicator is set in a target inheritance structure on the target for a corresponding target data block, the source data block is copied to each corresponding target data block, and an indicator is set in each target change recording structure on each target for the target data block corresponding to the source data block being destaged.

14 Claims, 14 Drawing Sheets

OTHER PUBLICATIONS

Preliminary Amendment filed on May 9, 2012, 7 pp., for U.S. Appl. No. 13/467,530, filed on May 9, 2012, entitled "Multiple Incremental Virtual Copies" by inventors M.T. Benhase, T.M. Brown, L.M. Gupta, R.M. Matosevich, C.S. Mellgren and G.A. Spear (18.36201).
Office Action dated Jun. 22, 2010, pp. 1-13, for U.S. Appl. No. 13/467,530, entitled "Multiple Incremental Virtual Copies" by inventors M.T. Benhase, T.M. Brown, L.M. Gupta, R.M. Matosevich, C.S. Mellgren and G.A. Spear (18.362C1).

Response dated Sep. 24, 2012, pp. 1-10, to Office Action dated Jun. 22, 2012, pp. 1-13, for U.S. Appl. No. 13/467,530, entitled "Multiple Incremental Virtual Copies" by inventors M.T. Benhase, T.M. Brown, L.M. Gupta, R.M. Matosevich, C.S. Mellgren and G.A. Spear (18.362C1).
Notice of Allowance dated Dec. 21, 2012, pp. 1-11, for U.S. Appl. No. 13/467,530, by inventors M.T. Benhase, T.M. Brown, L.M. Gupta, R.M. Matosevich, C.S. Mellgren and G.A. Spear (18.362C1).

* cited by examiner

MULTIPLE INCREMENTAL VIRTUAL COPIES

BACKGROUND

1. Field

Embodiments of the invention relate to efficient multiple incremental virtual copies.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FLASHCOPY® operation. (FLASHCOPY is a registered trademark or common law mark of International Business Machines Corporation in the United States and/or other countries.) A FLASHCOPY® operation involves establishing a logical point-in-time relationship between source and target volumes on the same or different devices. The FLASHCOPY® operation guarantees that until a track in a FLASHCOPY® relationship has been hardened to its location on the target disk, the track resides on the source disk. A relationship table is used to maintain information on all existing FLASHCOPY® relationships in the subsystem. During the establish phase of a FLASHCOPY® relationship, one entry is recorded in the source and target relationship tables for the source and target that participate in the FLASHCOPY® being established. Each added entry maintains all the required information concerning the FLASHCOPY® relationship. Both entries for the relationship are removed from the relationship tables when all FLASHCOPY® tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the FLASHCOPY® relationship have not yet been copied over and are thus protected tracks. Each track in the target device is represented by one bit in the bitmap. The target bit is set when the corresponding track is established as a target track of a FLASHCOPY® relationship. The target bit is reset when the corresponding track has been copied from the source location and destaged to the target device due to writes on the source or the target device, or a background copy task.

In the prior art, as part of the establishment of the logical point-in-time relationship during the FLASHCOPY® operation, all tracks in the source cache that are included in the FLASHCOPY® relationship must be destaged to the physical source volume, e.g., source DASD, and all tracks in the target cache included in the FLASHCOPY® must be discarded. Further details of the FLASHCOPY® operations are described in the U.S. Pat. No. 6,611,901, issued on Aug. 26, 2003, which patent is incorporated herein by reference in its entirety.

Once the logical relationship is established, hosts may then have immediate access to data on the source and target volumes, and the data may be copied as part of a background operation. A read to a track that is a target in a FLASHCOPY® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FLASHCOPY® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes. Instant virtual copy techniques, such as a FLASHCOPY® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

Thus, an instant virtual copy may be described as an instant snapshot of a data set or volume. There is a source volume and a target volume. The target volume is an instant snapshot of the source volume. Any changes to the source volume after the instant virtual copy has been established are not copied to the target.

An incremental virtual copy (e.g., an incremental FLASHCOPY®) is an enhancement of an instant virtual copy. The incremental virtual copy creates multiple snapshots over a period of time using the same source volume and target volume.

In an incremental virtual copy, the first flash of a source volume to a target volume is usually done with background copy. When the background copy finishes, data has been copied from the source volume to the target volume. After the first virtual copy is established, there may be subsequent flashes or increments between the same source volume and target volume. Subsequent flashes or increments copy modified tracks from the source volume to the target volume since the last flash or increment.

An incremental virtual copy technique is described in U.S. Pat. No. 6,996,586, issued on Jun. 18, 2003, which patent is incorporated herein by reference in its entirety.

The incremental virtual copy has two bitmaps: 1) a Change Recording (CR) bitmap on the source volume and 2) a Change Recording (CR) bitmap on the target volume. The source CR bitmap has a bit for every track on the source volume. When there is a write on a track of the source volume after the virtual copy has been established, then a bit is set in the source CR bitmap to indicate that the track needs to be copied in the subsequent flash or increment. If there is a write on the target volume after the establish, then a bit is set in the target CR bitmap to indicate that the track needs to be copied in the subsequent flash or increment. On a subsequent flash or increment, the source and target CR bitmaps are merged and then copied to the target CR bitmap to indicate the tracks that need to be copied from the source volume.

The incremental virtual copy has a CR bitmap on a source volume for every incremental virtual copy. So, if there are N incremental virtual copy targets, then N source CR bitmaps are kept on the source volume. There is a need in the art for more efficient multiple incremental copies.

BRIEF SUMMARY

Provided are a method, computer program product, and system for, in response to establishing each incremental virtual copy from a source to a target, creating a target change recording structure for the target. While performing destage to a source data block at the source, it is determined that there is at least one incremental virtual copy target for this source data block. For each incremental virtual copy relationship where the source data block is newer than the incremental virtual copy relationship and an indicator is set in a target inheritance structure on the target for a corresponding target data block, the source data block is copied to each corresponding target data block, and an indicator is set in each target change recording structure on each target for the target data block corresponding to the source data block being destaged.

BRIEF DESCRIPTION OF THE SEVERAL VIEWS OF THE DRAWINGS

Referring now to the drawings in which like reference numbers represent corresponding parts throughout:

FIG. 12 is formed by FIGS. 12A and 12B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments avoid having a source change recording structure on the source storage. Embodiments provide a technique in which there is a target change recording structure at a target, the source directly updates the target change recording structure, and the target change recording structure controls the copying from the source to the target. Thus, embodiments have one target change recording structure for an incremental virtual copy on the copy target.

Figure 1:
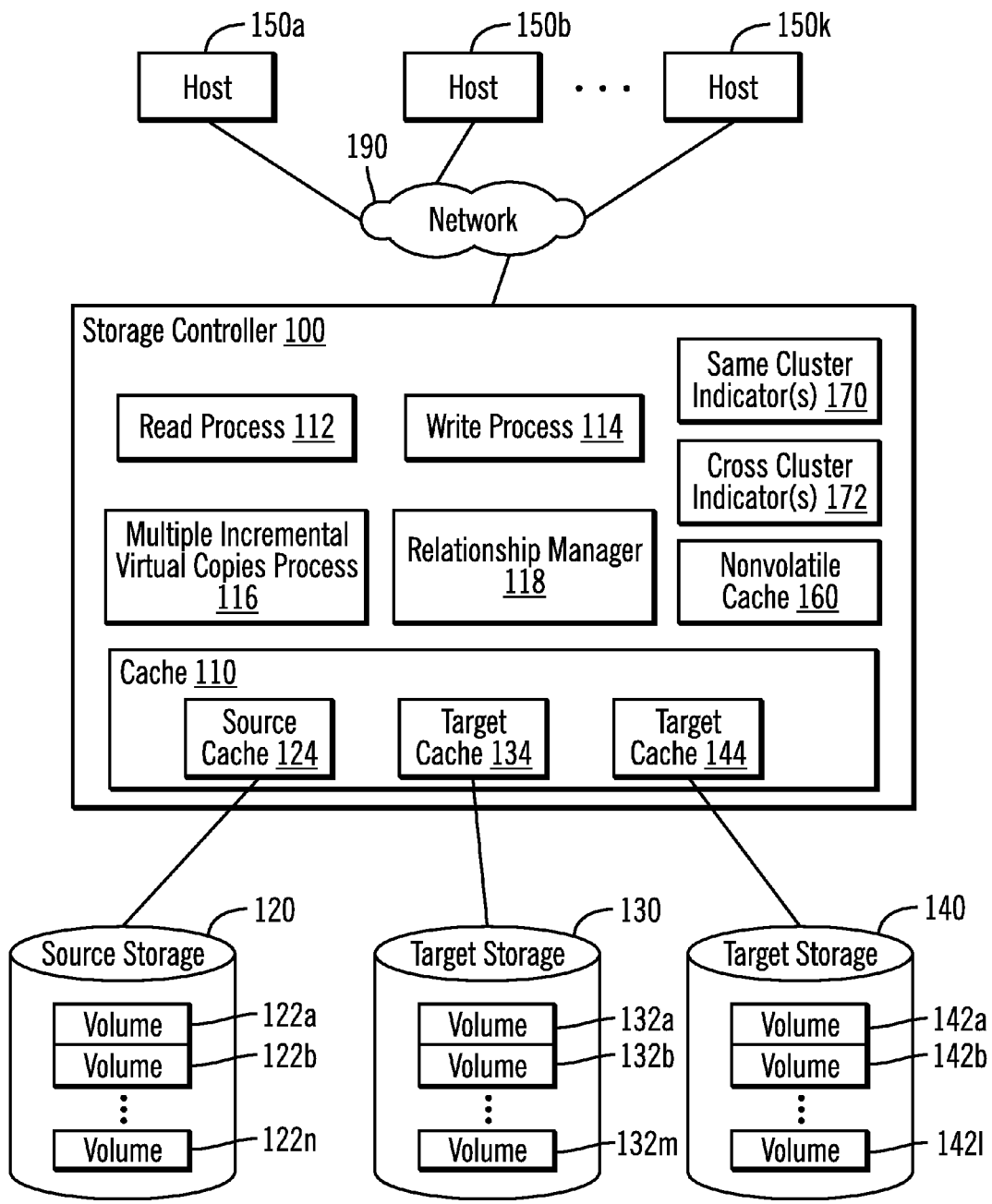
FIG. 1 illustrates, in a block diagram, a computing environment in accordance with certain embodiments of the invention.

FIG. 1 illustrates, in a block diagram, a computing environment in accordance with certain embodiments of the invention. A storage controller 100 receives Input/Output (I/O) requests from hosts 150a, b, . . . k (wherein a, b, and l may be any integer value) over a network 190 directed toward storage devices 120, 130, 140 configured to have volumes (e.g., Logical Unit Numbers, Logical Devices, etc.) 122a, b . . . n, 132a, b . . . m, 142a, b . . . l, respectively, where m, n, and l may be different integer values or the same integer value. In certain embodiments, the size of a target storage 130, 140 may be larger than or equal to the source storage 120. Although only two target storages 130, 140 are illustrated for ease of understanding, embodiments may use two or more target storages.

In certain embodiments, source data blocks on the source storage 120 correspond to (i.e., are copies of) target data blocks on the target storage 130 and/or 140.

Figure 2:
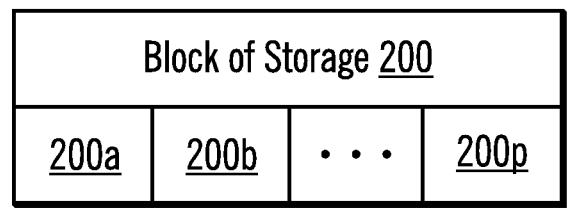
FIG. 2 illustrates, in a block diagram, a block of storage in accordance with certain embodiments.

FIG. 2 illustrates, in a block diagram, a block of storage in accordance with certain embodiments. The source storage 120 includes one or more volumes 122a, b . . . n, which may be divided into blocks of storage 200 containing data blocks (also referred to as "blocks of data"), and the blocks of storage 200 are further divided into sub-blocks of storage (200a-200p, where a and p may be any integer value) that contain sub-data blocks (also referred to as "sub-blocks of data"). A volume may be any logical or physical element of storage. In certain embodiments, the data blocks are contents of tracks, while the sub-data blocks are contents of sectors of tracks.

Target storage 130 maintains copies of all or a subset of the volumes 122a, b . . . n of the source storage 120. Additionally, target storage 130 may be modified by, for example, host 150. Target storage 130 includes one or more volumes 132a, b . . . m, which may be divided into blocks of storage 200 containing data blocks, and the blocks of storage 200 are further divided into sub-blocks of storage (200a-200p, where a and p may be any integer value) that contain sub-data blocks. A volume may be any logical or physical element of storage. In certain embodiments, the data blocks are tracks, while the sub-data blocks are sectors of tracks.

Target storage 140 maintains copies of all or a subset of the volumes 122a, b . . . n of the source storage 120. Additionally, target storage 140 may be modified by, for example, host 150. Target storage 140 includes one or more volumes 142a, b . . . l, which may be divided into blocks of storage 200 containing data blocks, and the blocks of storage 200 are further divided into sub-blocks of storage (200a-200p, where a and p may be any integer value) that contain sub-data blocks. A volume may be any logical or physical element of storage. In certain embodiments, the data blocks are tracks, while the sub-data blocks are sectors of tracks.

For ease of reference, the terms tracks and sectors will be used herein as examples of data blocks and sub-data blocks, but use of these terms is not meant to limit embodiments of the invention to tracks and sectors. The embodiments of the invention are applicable to any type of storage, block of storage or data block divided in any manner. Moreover, although embodiments of the invention refer to data blocks, alternate embodiments of the invention are applicable to sub-data blocks.

The storage controller 100 includes a cache 110. Portions of cache 110 form source cache 124, target cache 134, and target cache 144. The source cache 124 stores (i.e., maintains) updates to data blocks in the source storage 120 until written to source storage 120 (i.e., the data blocks are destaged to physical storage). The target cache 134 stores (i.e., maintains) updates to data blocks in the target storage 130 until written to target storage 130 (i.e., the data blocks are destaged to physical storage). The target cache 144 stores (i.e., maintains) updates to data blocks in the target storage 140 until written to target storage 140 (i.e., the data blocks are destaged to physical storage).

In various embodiments, the source cache 124, target cache 134, and target cache 144 may comprise separate memory devices or different sections of a same memory device. The source cache 124, the target cache 134, and the target cache 144 are used to buffer read and write data being transmitted between the hosts 150a, b . . . k, source storage 120, and target storages 130, 140. Further, although caches 124, 134, and 144 are referred to as source and target caches for holding source or target data blocks in a point-in-time copy relationship, the caches 124, 134, and 144 may store at the same time source and target data blocks in different point-in-time copy relationships.

Additionally, the storage controller 100 includes a non-volatile cache 160. The non-volatile cache 160 may be, for example, a battery-backed up volatile memory, to maintain a non-volatile copy of data updates.

The storage controller 100 further includes a read process 112 for reading data, a write process 114 for writing data, a multiple incremental virtual copies process 116, and a relationship manager 118.

The read process 112 reads data from storages 120, 130, and 140 to caches 124, 134, and 144, respectively. The write process 114 writes data from caches 124, 134, and 144 to storages 120, 130, and 140, respectively. The multiple incremental virtual copies process 116 performs a multiple incremental virtual copies operation that copies data from source storage 120 to one or more target storages 130, 140. The relationship manager 118 keeps track of all the incremental virtual copy (e.g., FLASHCOPY® operation) relationships. The relationship manager 118 provides the relationships for a given volume.

In certain embodiments of the invention, the multiple incremental virtual copies process 116 may be executed at another storage controller connected to storage controller 100 instead of, or in addition to, execution at the storage controller 100.

In accordance with certain alternative embodiments, the storage controller 100 includes one or more same cluster indicators 170 and one or more cross cluster indicators 172. In certain embodiments, there is one same cluster indicator 170 for a volume, and there is one cross cluster indicator 172 for a volume.

Embodiments of the invention are applicable to the transfer of data between any storage mediums, which for ease of reference will be referred to herein as source storage and target storages. For example, certain embodiments of the invention may be used with storage mediums located at a single storage controller, as illustrated in FIG. 1. Moreover, certain alternative embodiments of the invention may be used with storage mediums located at different storage controllers, different physical sites, etc. Also, for ease of reference, a data block in source storage will be referred to as a "source data block," and a data block in target storage will be referred to as a "target data block."

In certain embodiments, removable storages (instead of or in addition to target storages 130, 140) may be used to maintain copies of all or a subset of the source storage 120, and the embodiments of the invention transfer data to the removable storage in addition to or instead of to the target storages 130, 140. The removable storages may reside at the storage controller 100.

The storage controller 100 may further include a processor complex (not shown) and may comprise any storage controller or server known in the art, such as an ENTERPRISE STORAGE SERVER® (ESS) storage controller, a SYSTEM STORAGE® DS8000 storage controller, etc. (ENTERPRISE STORAGE SERVER and SYSTEM STORAGE are registered trademarks or common law marks of International Business Machines Corporation in the United States and/or other countries.) The hosts 150a, b . . . k may comprise any computing device known in the art. The storage controller 100 and host system(s) 150a, b . . . k communicate via a network 190, which may comprise any type of network, such as, a Storage Area Network (SAN), a Local Area Network (LAN), a Wide Area Network (WAN), the Internet, an Intranet, etc. The source storage 120 and target storage 130 may each comprise an array of storage devices, such as Direct Access Storage Devices (DASDs), Just a Bunch of Disks (JBOD), Redundant Array of Independent Disks (RAID), virtualization device, etc.

Additionally, although FIG. 1 illustrates a single storage controller 100, one skilled in the art would know that multiple storage controllers may be connected via a network (e.g., a Local Area Network (LAN), Wide Area Network (WAN), the Internet, etc.), and one or more of the multiple storage controllers may implement the invention.

When host 150 wishes to update a data block in source storage 120, host 150 writes data to a block of storage in source cache 124. Write operations modify the block of storage in source cache 124 synchronously (i.e., writing host 150 waits for the operation to complete), and then, in a background process, source cache 124 content is written to source storage 120. A write operation may update data, write new data, or write the same data again. Writing data in source cache 124 to source storage 120 is called a destage operation. Copying all or a portion of a data block from source storage 120 to source cache 124 is a staging operation. Likewise, data may be staged and destaged between target storage 130 and target cache 134. Moreover, data may be staged from source storage 120 to target cache 134.

Figure 3:
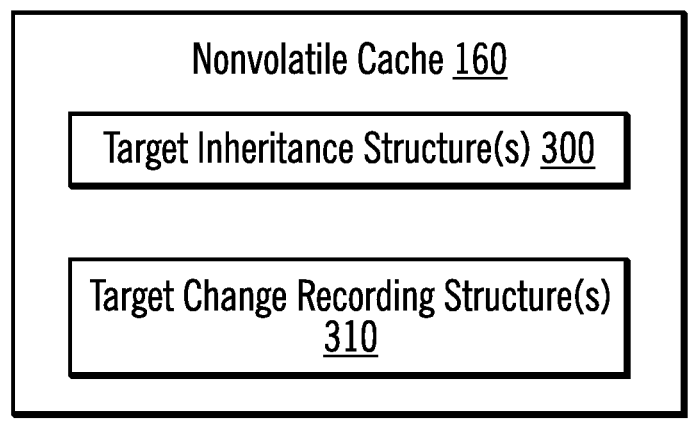
FIG. 3 illustrates structures in accordance with certain embodiments of the invention.

FIG. 3 illustrates structures 300 and 310 in accordance with certain embodiments of the invention. Nonvolatile cache 160 includes one or more target inheritance structures 300 and one or more target change recording structures 310. There is one target inheritance structure 300 for each target storage 130, 140. There is one target change recording structure 310 for each target storage 130, 140.

The target inheritance structure 300 indicates which data blocks on the target storage need to be copied from the source storage 120 for a virtual copy. The target inheritance structure 300 includes an indicator (e.g., a bit) for each data block in, for example, a volume. When an indicator is set to a first value (e.g., one), the setting indicates that the data block is to be retrieved from the source storage 120 for a staging operation or indicates that the data block is to be copied to target storage for a virtual copy operation. When an indicator is set to a second value (e.g., zero), the setting indicates that the data block is to be retrieved from the target storage 130 for a staging operation or indicates that the data block is not to be copied from source storage 120 to target storage 130 for a virtual copy operation.

A target change recording structure 310 is used to determine which data blocks have been modified at the source or target storage after the incremental virtual copy has been established. The target change recording structure 310 includes an indicator (e.g., a bit) for each data block in the target storage 130 that is part of the incremental virtual copy relationship. When an indicator is set to a first value (e.g., one), the setting indicates that the data block has been updated at the source or the target since the last incremental virtual copy operation. When an indicator is set to a second value (e.g., zero), the setting indicates that the data block has not been updated since the last incremental virtual copy operation.

In certain embodiments of the invention, each structure 300, 310 comprises a bitmap, and each indicator comprises a bit. In each structure 300, 310, the nth indicator corresponds to the nth data block (e.g., the first indicator in each structure 300, 310 corresponds to the first data block). Although the structures 300, 310 have been illustrated as separate structures, the structures may be combined in any form without departing from the scope of the invention. In certain embodiments of the invention, there is a copy of each structure for each volume. In certain alternative embodiments of the invention, there is a single copy of each structure for all volumes.

With embodiments, on a destage to a source data block after the incremental virtual copy establish, the multiple incremental virtual copies process 116 updates the target change recording structure 310 on the target to indicate the source data block needs to be copied to the corresponding target data block on a subsequent incremental virtual copy operation. Embodiments do not do this for cross-cluster incremental virtual copy since updating the target change recording structure 310 on the target can hold the write and updating the target change recording structure 310 cross-cluster takes time.

With embodiments, on a write to the target data block after the incremental virtual copy establish, the multiple incremental virtual copies process 116 update the target change recording structure 310 on the target storage to indicate the data block needs to be copied on the subsequent increment.

With embodiments, on an increment, the multiple incremental virtual copies process 116 merges the target change recording structure 310 with the target inheritance structure 300 to indicate data blocks on the target storage that still need to be copied from the source storage 120. The merge updates the target inheritance structure 300. With the merge, if a bit is set in one structure 300, 310, but not the other structure 300, 310, the merged bitmap has the bit set. With the merge, if a bit is set in both structures 300, 310, the merged bitmap has the bit set. With the merge, if the bit is not set in either structure 300, 310, then the merged bitmap does not have the bit set.

Figure 4:
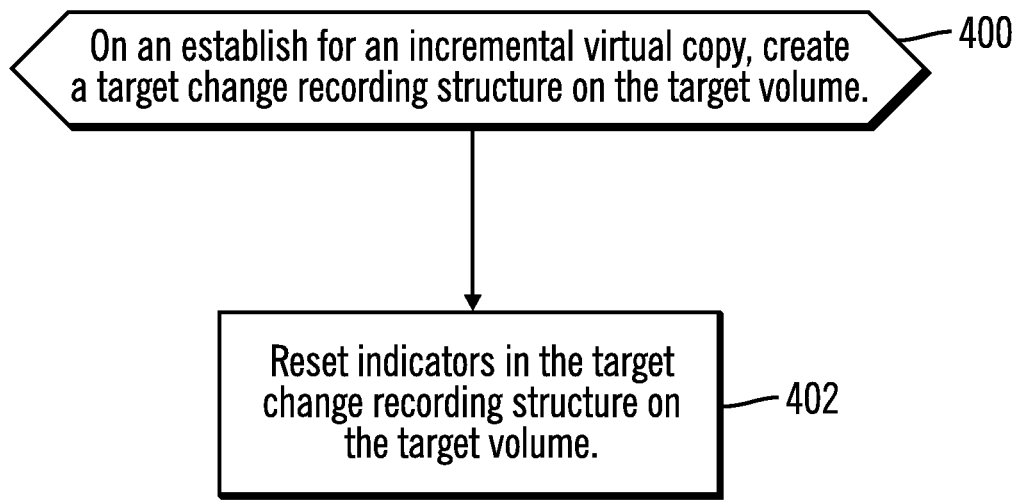
FIG. 4 illustrates logic, in a flow diagram, performed by a multiple incremental virtual copies process to establish an incremental virtual copy in accordance with certain embodiments.

FIG. 4 illustrates logic, in a flow diagram, performed by the multiple incremental virtual copies process 116 to establish an incremental virtual copy in accordance with certain embodiments. Control begins at block 400 with the multiple incremental virtual copies process 116, on an establish for an incremental virtual copy from a source volume to one target volume, creating a target change recording structure 310 on the target volume (without creating a source change recording structure on the source as is done with incremental virtual copy using traditional techniques). In block 402, the multiple incremental virtual copies process 116 resets indicators in the target change recording structure 310 on the target volume.

Figure 5:
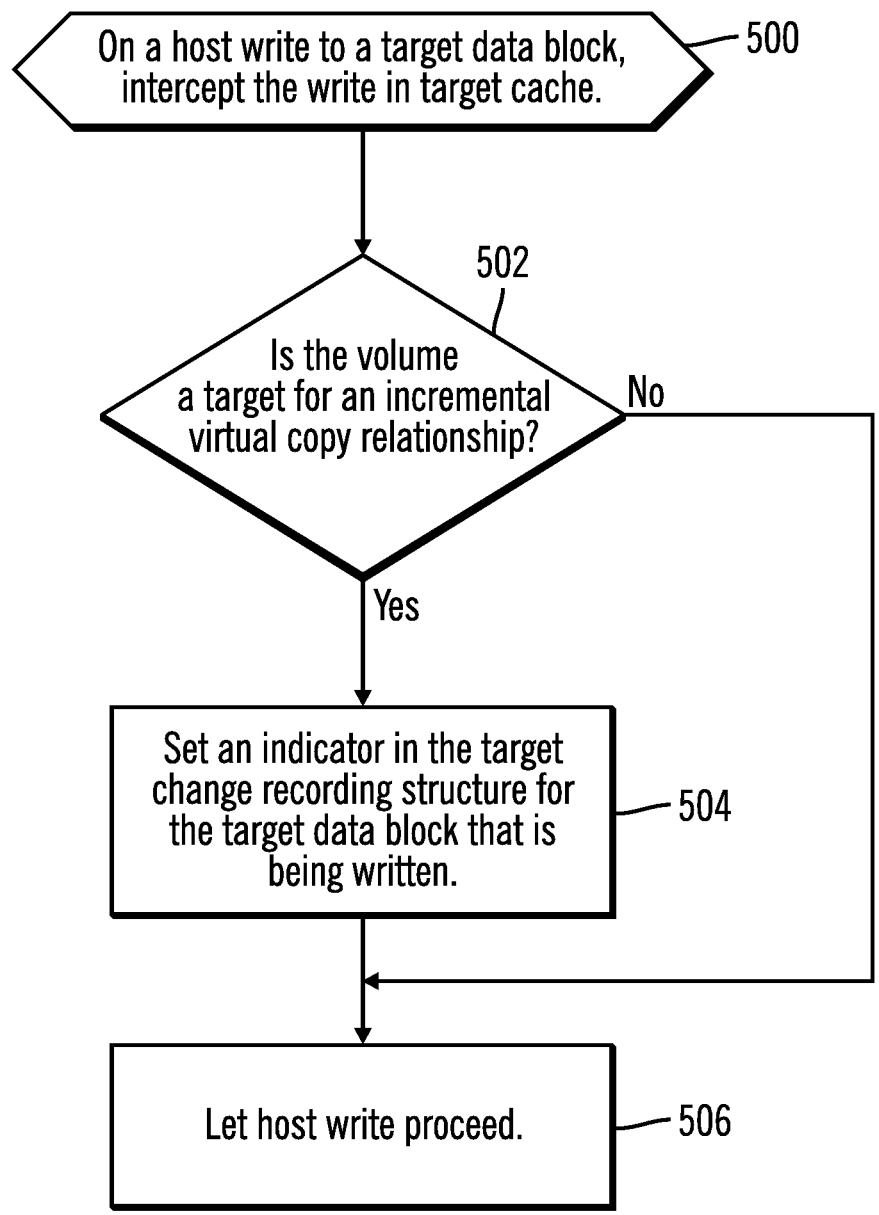
FIG. 5 illustrates logic, in a flow diagram, performed by a multiple incremental virtual copies process for a write to a target volume after the incremental virtual copy has been established in accordance with certain embodiments.

FIG. 5 illustrates logic, in a flow diagram, performed by the multiple incremental virtual copies process 116 for a write to the target volume after the incremental virtual copy has been established in accordance with certain embodiments. Control begins at block 500 with the multiple incremental virtual copies process 116, on a host write to a target data block, intercepting the write in the target cache. In block 502, the multiple incremental virtual copies process 116 determines whether the volume is a target for an incremental virtual copy relationship. The multiple incremental virtual copies process 116 makes the determination by looking up the relationship manager 118. If the volume is a target for the incremental virtual copy process, processing continues to block 504, otherwise, processing continues to block 506. In block 504, the multiple incremental virtual copies process 116 sets an indicator in the target change recording structure 310 for the target data block that is being written. In block 506, the multiple incremental virtual copies process 116 lets the host write proceed.

With embodiments, in response to receiving a write to a source data block, the target change recording structure is not updated. Instead, processing occurs on destage of a source data block at the source.

Figure 6:
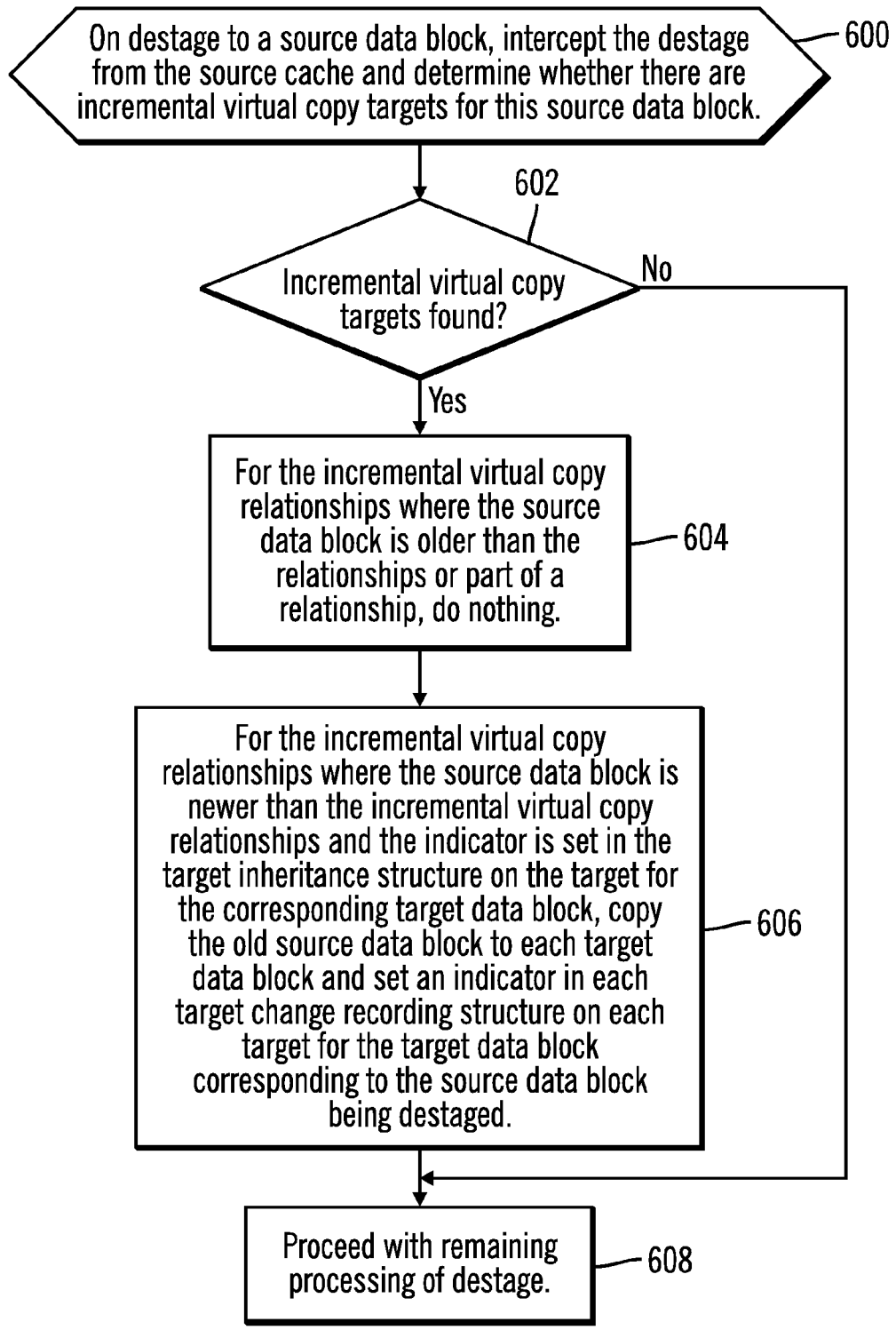
FIG. 6 illustrates logic, in a flow diagram, performed by a multiple incremental virtual copies process to destage on the source after the incremental virtual copy has been established in accordance with certain embodiments.

FIG. 6 illustrates logic, in a flow diagram, performed by the multiple incremental virtual copies process 116 to destage on the source after the incremental virtual copy has been established in accordance with certain embodiments. Control begins at block 600 with the multiple incremental virtual copies process 116, on destage to a source data block, intercepting the destage from the source cache 124 and determining whether there are incremental virtual copy targets for this source data block (i.e., whether the source data block is in an incremental virtual copy relationship with any target data block of any target). In block 602, if incremental virtual copy targets have been found, processing continues to block 604, otherwise, processing continues to block 608. In block 604, for the incremental virtual copy relationships where the source data block is older than the incremental virtual copy relationships or part of an incremental virtual copy relationship, the multiple incremental virtual copies process 116 does nothing (and processing falls through to block 608). The source data block is older than the incremental virtual copy relationship when the source data block has been updated before the time of creation of the incremental virtual copy relationship. In block 606, for the incremental virtual copy relationships where the source data block is newer than the incremental virtual copy relationships and the indicator is set in the target inheritance structure 300 on the target for the corresponding target data block, the multiple incremental virtual copies process 116 copies the old source data block to each corresponding target data block and sets an indicator in each target change recording structure 310 on each target for the target data block corresponding to the source data block being destaged. The source data block is newer than the incremental virtual copy relationship when the source data block has been updated at the same time or after the time of creation of the incremental virtual copy relationship. In block 608, the multiple incremental virtual copies process 116 proceeds with the remaining processing of destage.

Figure 7:
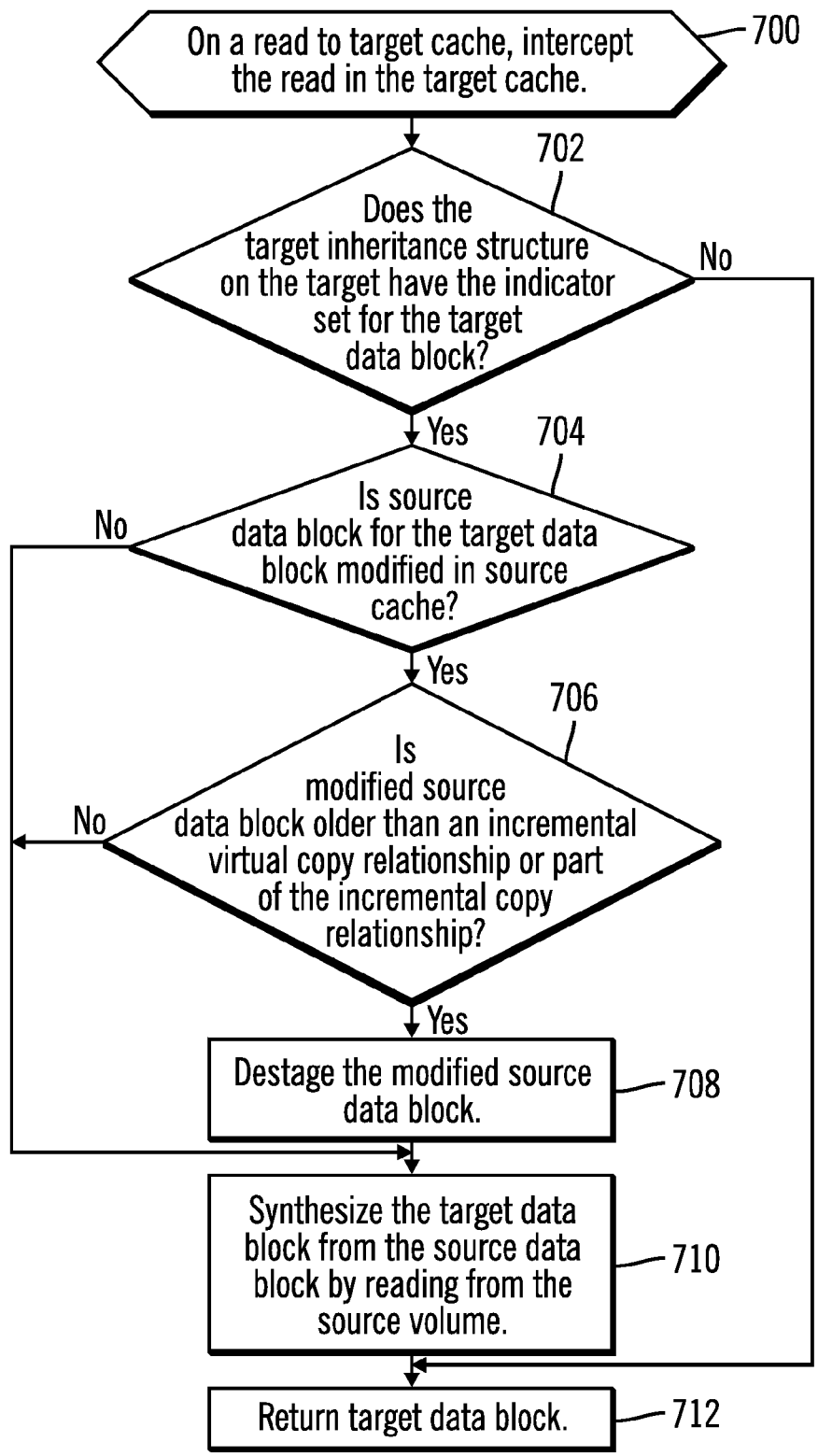
FIG. 7 illustrates logic, in a flow diagram, performed by a multiple incremental virtual copies process to read to the target after the incremental virtual copy has been established in accordance with certain embodiments.

FIG. 7 illustrates logic, in a flow diagram, performed by the multiple incremental virtual copies process 116 to read to the target after the incremental virtual copy has been established in accordance with certain embodiments. Control begins at block 700 with the multiple incremental virtual copies process 116, on a read to a target cache, intercepting the read in the target cache. In block 702, the multiple incremental virtual copies process 116 determines whether the target inheritance structure 300 on the target has the indicator set for the target data block. If so, processing continues to block 704, otherwise, processing continues to block 712. In block 704, the multiple incremental virtual copies process 116 determines whether the source data block for the target data block has been modified in the source cache 124. If so, processing continues to block 706, otherwise, processing continues to block 710 to synthesize the read from the source. In block 706, the multiple incremental virtual copies process 116 determines whether the modified source data block is older than an incremental virtual copy relationship or part of the incremental copy relationship for the target. If so, processing continues to block 708, otherwise, processing continues to block 710 to synthesize the read from the source. In block 708, the multiple incremental virtual copies process 116 destages the modified source data block. In block 710, the multiple incremental virtual copies process 116 synthesizes the target data block from the source data block by reading from the source volume. That is, the source data block is read and returned to the host as the target data block. In block 712, the multiple incremental virtual copies process 116 returns the target data block.

Figure 8:
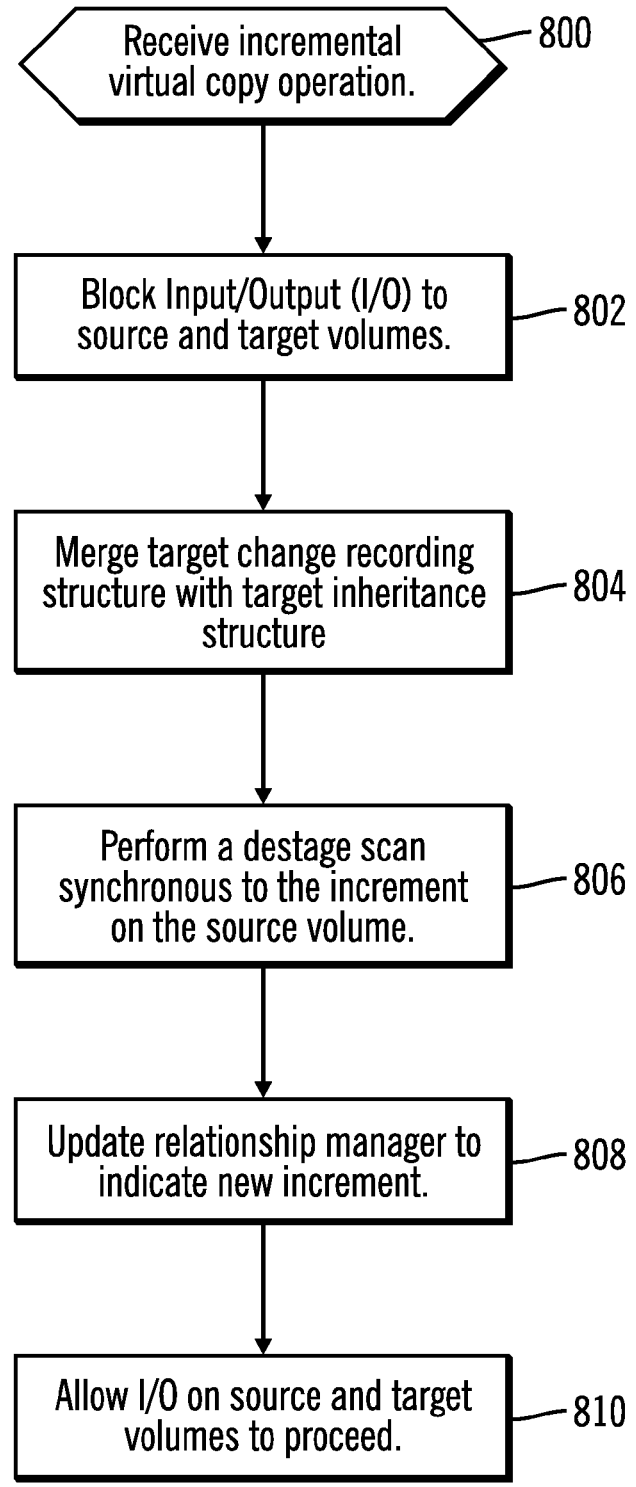
FIG. 8 illustrates logic, in a flow diagram, performed by a multiple incremental virtual copies process to perform an instant virtual copy increment in accordance with certain embodiments.

FIG. 8 illustrates logic, in a flow diagram, performed by the multiple incremental virtual copies process 116 to perform an incremental virtual copy operation in accordance with certain embodiments. Control begins at block 800 with the multiple incremental virtual copies process 116 receiving a new (i.e., subsequent to a previous) incremental virtual copy operation. In block 802, the multiple incremental virtual copies process 116 blocks (i.e., queues or otherwise holds off) Input/Output (I/O) to source and target volumes. In block 804, the multiple incremental virtual copies process 116 merges the target change recording structure 310 with the target inheritance structure 300. In block 806, the multiple incremental virtual copies process 116 performs a destage scan synchronous to the increment on the source volume. The incremental virtual copy operation will wait for this destage scan to finish. The destage scan will destage the modified data in source cache 124 for the source volume. In block 808, the multiple incremental virtual copies process 116 updates the relationship manager 118 to indicate the new incremental virtual copy operation. Updating the relationship manager 118 sets the timestamp or a generation number for the incremental virtual copy relationship. In block 810, the multiple incremental virtual copies process 116 allows I/O on the source and target volumes to proceed.

Figure 11:
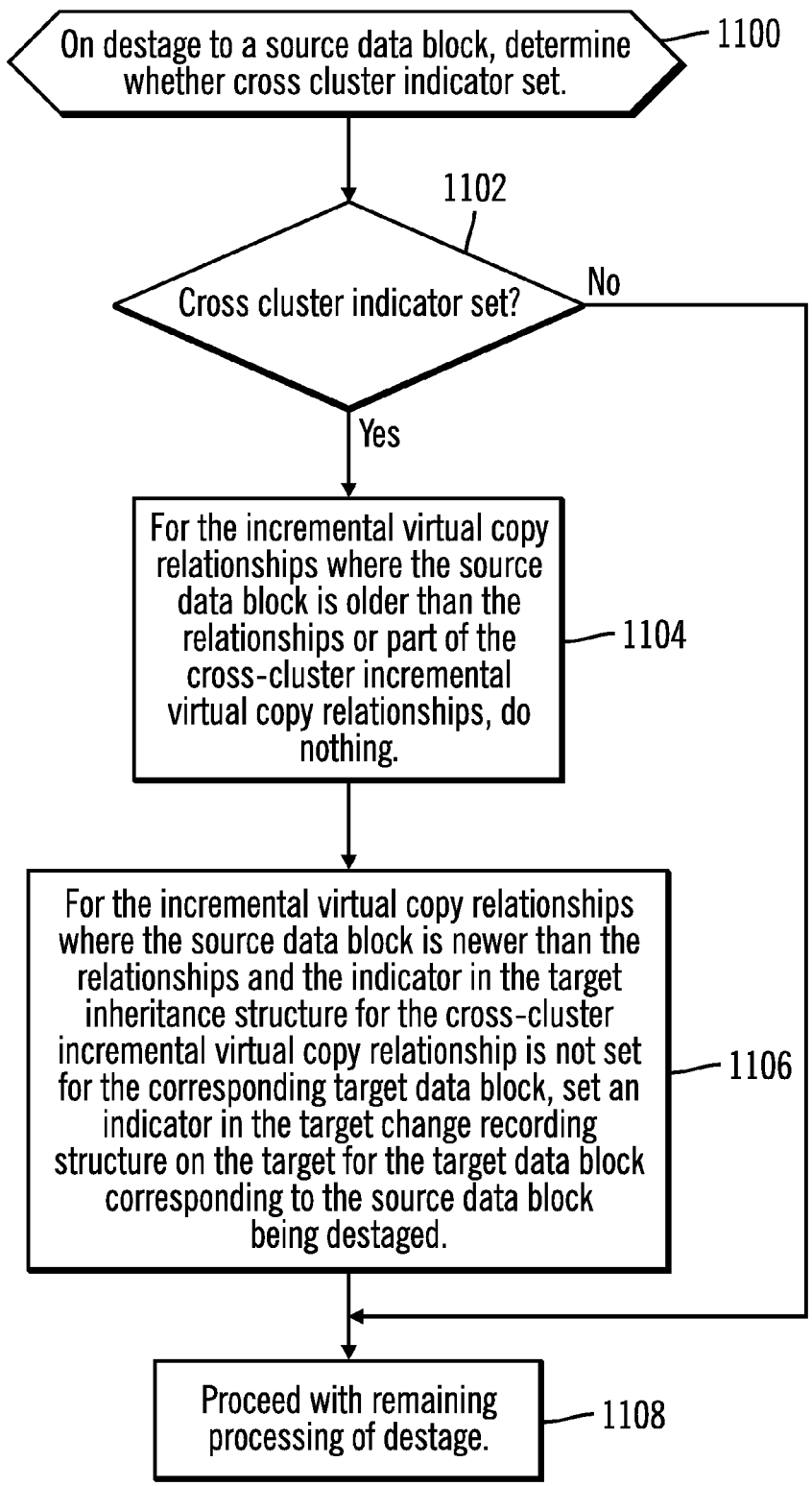
FIG. 11 illustrates logic, in a flow diagram, performed by a multiple incremental virtual copies process to destage on the source after the incremental virtual copy has been established based on clusters in accordance with certain embodiments.
Figure 12A:
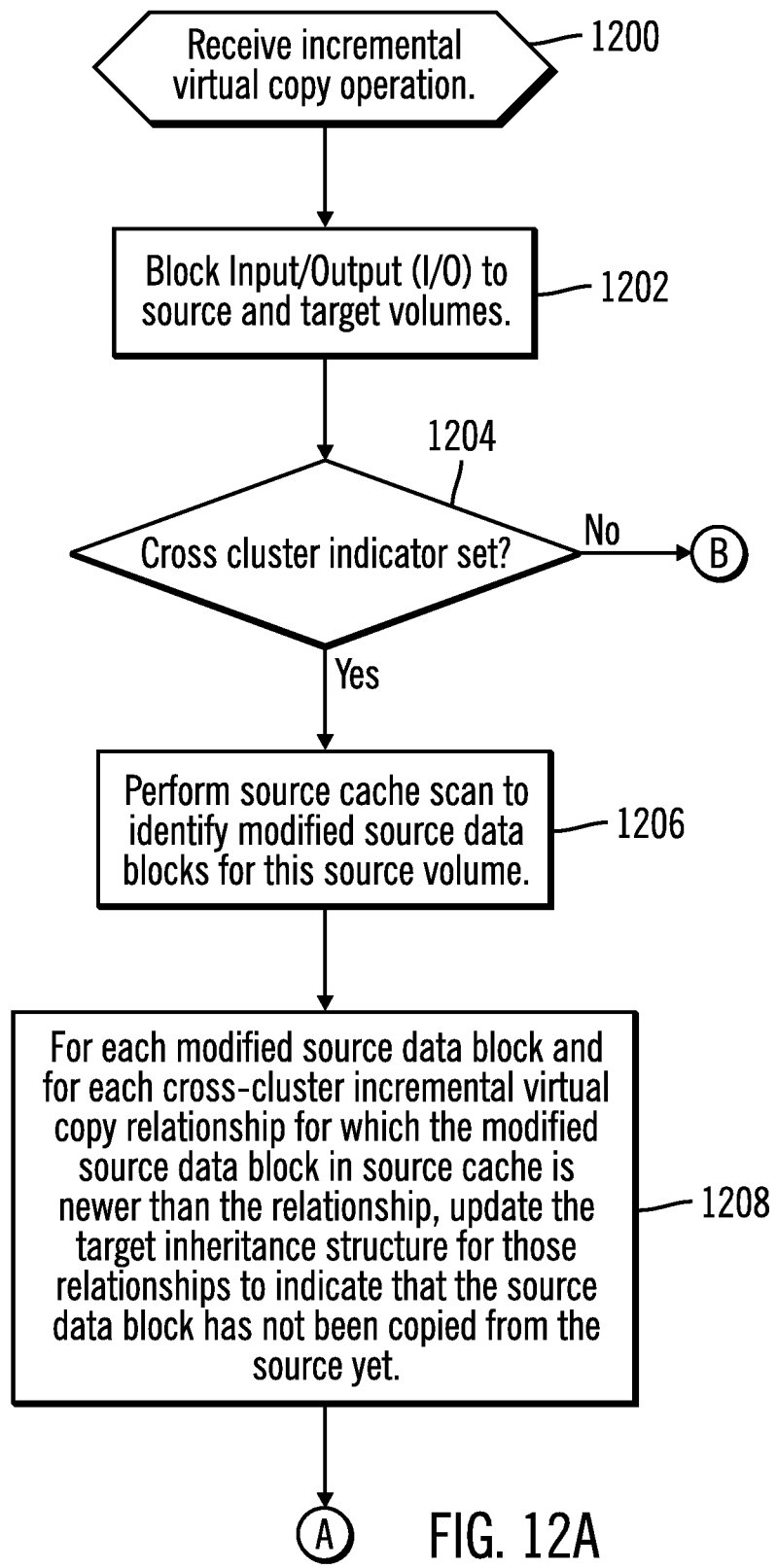
FIG. 12 illustrates logic, in a flow diagram, performed by a multiple incremental virtual copies process to perform an incremental virtual copy operation based on clusters in accordance with certain embodiments.
Figure 12B:
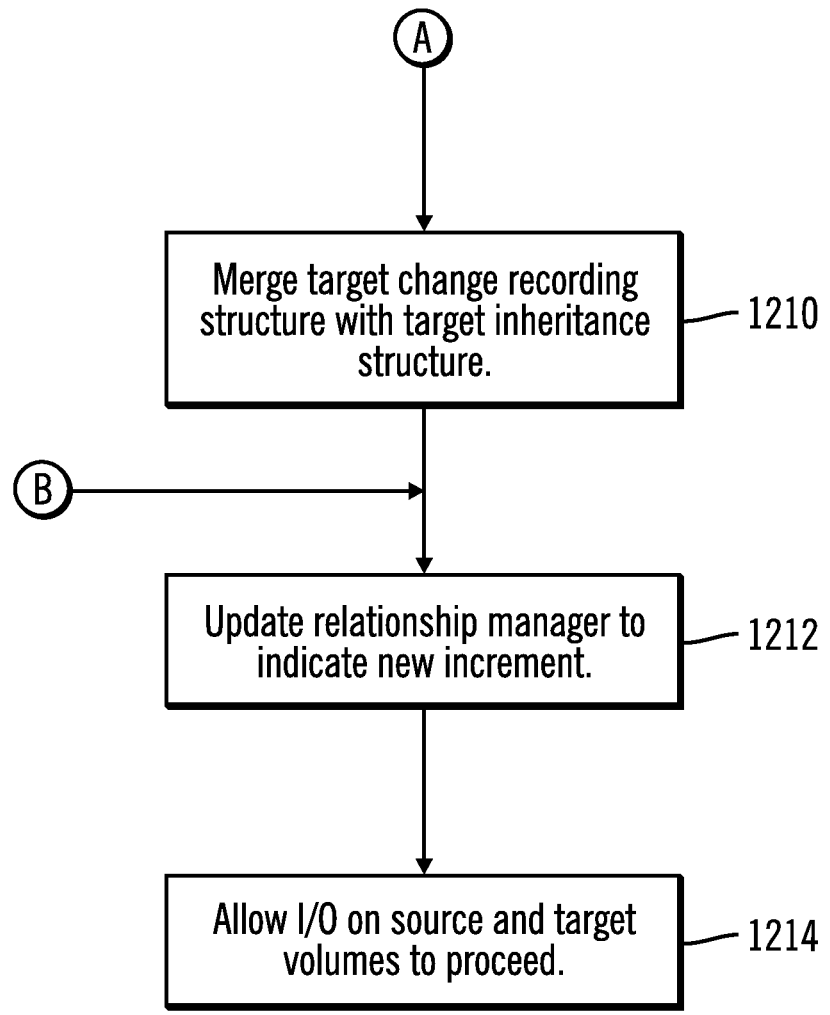
Figure 13:
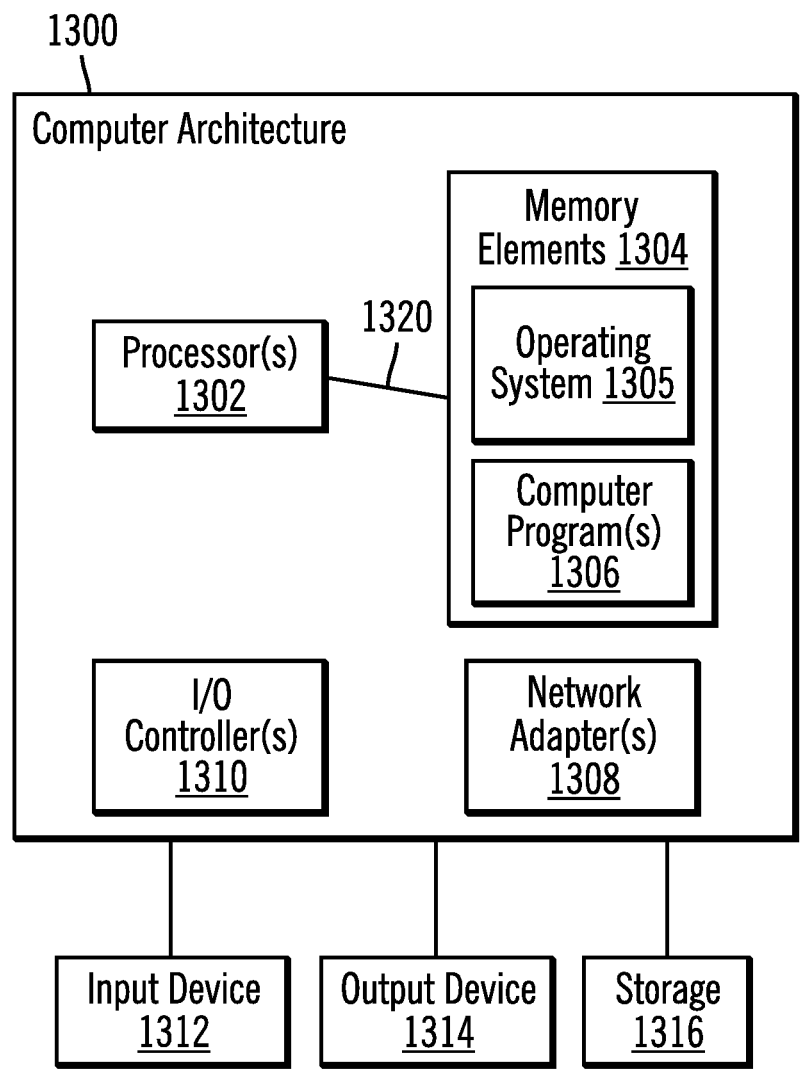
FIG. 13 illustrates a computer architecture that may be used in accordance with certain embodiments.

FIGS. 11-13 describe an alternative technique for incremental virtual copy operations that relies on a cache scan, rather than destage, to update the target change recording structure 310 for a same cluster incremental virtual copy.

Figure 9:
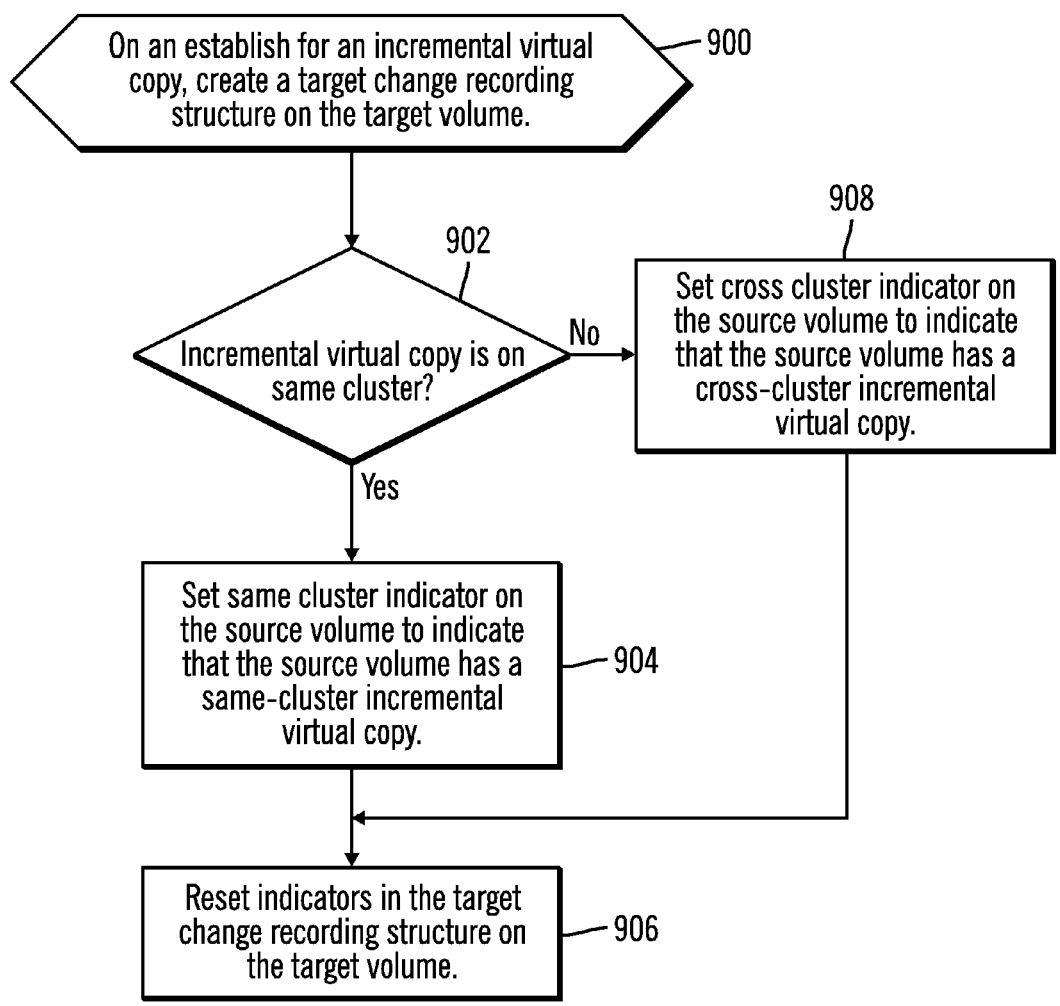
FIG. 9 illustrates logic, in a flow diagram, performed by a multiple incremental virtual copies process to establish an incremental virtual copy based on clusters in accordance with certain embodiments.

FIG. 9 illustrates logic, in a flow diagram, performed by the multiple incremental virtual copies process 116 to establish an incremental virtual copy based on clusters in accordance with certain embodiments. Control begins at block 900 with the multiple incremental virtual copies process 116, on an establish for an incremental virtual copy, creating a target change recording structure 310 on the target volume (without creating a source change recording structure on the source as is done with incremental virtual copy using traditional techniques). In block 902, the multiple incremental virtual copies process 116 determines whether an incremental virtual copy is on a same cluster (i.e., whether the source and target volumes are on a same cluster). If so, processing continues to block 904, otherwise, processing continues to block 908. In block 904, the multiple incremental virtual copies process 116 sets the same cluster indicator 170 on the source volume to indicate that the source volume has a same-cluster incremental virtual copy. In block 906, the multiple incremental virtual copies process 116 resets indicators in the target change recording structure 310 on the target volume. In block 908, the multiple incremental virtual copies process 116 sets the cross cluster indicator 172 on the source volume to indicate that the source volume has a cross-cluster incremental virtual copy (i.e., the source and target volumes are on different clusters).

Figure 10:
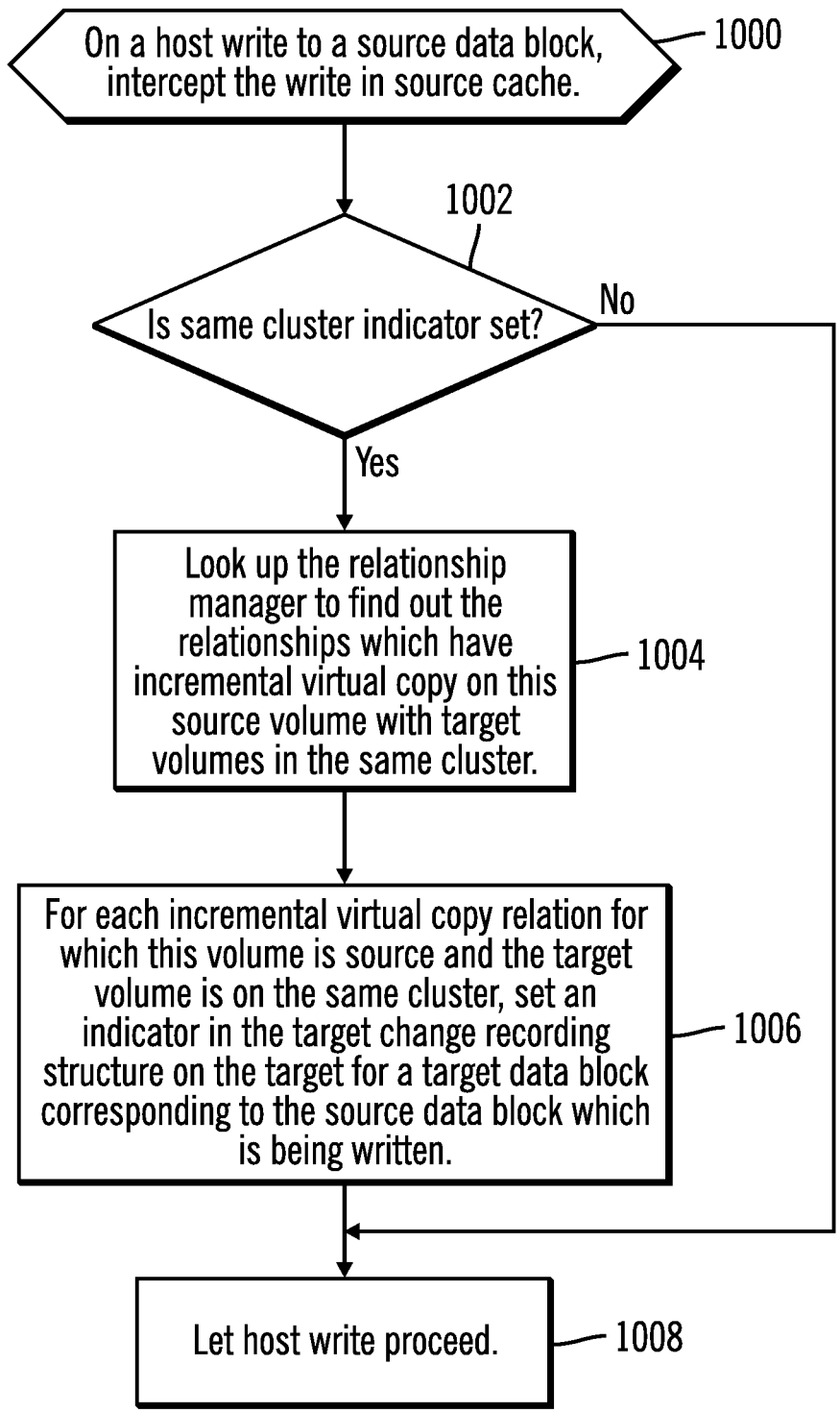
FIG. 10 illustrates logic, in a flow diagram, performed by a multiple incremental virtual copies process for a write to a source volume after the incremental virtual copy has been established based on clusters in accordance with certain embodiments.

FIG. 10 illustrates logic, in a flow diagram, performed by the multiple incremental virtual copies process 116 for a write to the source volume after the incremental virtual copy has been established based on clusters in accordance with certain embodiments. Control begins at block 1000 with the multiple incremental virtual copies process 116, on a host write to a source data block, intercept the write in the source cache. In block 1002, the multiple incremental virtual copies process 116 determines whether the same cluster indicator 170 is set to indicate that the source and target volumes are on the same cluster. If the source and target volumes are on the same cluster, processing continues to block 1004, otherwise, processing continues to block 1008. In block 1004, the multiple incremental virtual copies process 116 looks up the relationship manager 118 to find out the relationships which have incremental virtual copy on this source volume with target volumes in the same cluster. In block 1006, for each incremental virtual copy relation for which this volume is source and the target volume is on the same cluster, the multiple incremental virtual copies process 116 sets an indicator in the target change recording structure 310 on the target for a target data block corresponding to the source data block which is being written. In block 1008, the multiple incremental virtual copies process 116 lets the host write proceed.

The processing of FIG. 5 is used for a write to the target volume after the incremental virtual copy has been established based on clusters in accordance with certain embodiments.

FIG. 11 illustrates logic, in a flow diagram, performed by the multiple incremental virtual copies process 116 to destage on the source after the incremental virtual copy has been established based on clusters in accordance with certain embodiments. Control begins at block 1100 with the multiple incremental virtual copies process 116, on destage to a source data block, determining whether the cross cluster indicator 172 has been set to indicate that the source and target volumes are on different clusters. In block 1102, if the cross cluster indicator 172 is set, processing continues to block 1104, otherwise, processing continues to block 1108. In block 1104, for the incremental virtual copy relationships where the source data block is older than the incremental virtual copy relationships or part of the cross-cluster incremental virtual copy relationships, the multiple incremental virtual copies process 116 does nothing (and processing falls through to block 1108). In block 1106, for the incremental virtual copy relationships where the source data block is newer than the incremental virtual copy relationships and the indicator in the target inheritance structure 300 for the cross-cluster incremental virtual copy relationship is not set for the corresponding target data block, the multiple incremental virtual copies process 116 sets an indicator in the target change recording structure on the target for the target data block corresponding to the source data block being destaged. In block 1108, the multiple incremental virtual copies process 116 proceeds with the remaining processing of destage.

FIG. 12 illustrates logic, in a flow diagram, performed by the multiple incremental virtual copies process 116 to perform an incremental virtual copy operation based on clusters in accordance with certain embodiments. FIG. 12 is formed by FIGS. 12A and 12B. Control begins at block 1200 with the multiple incremental virtual copies process 116 receiving an incremental virtual copy operation. In block 1202, the multiple incremental virtual copies process 116 blocks (i.e., queues or otherwise holds off) Input/Output (I/O) to source and target volumes. In block 1204, the multiple incremental virtual copies process 116 determines whether the cross cluster indicator 172 has been set to indicate that the source and target volumes are on different clusters. If the cross cluster indicator 172 is set, processing continues to block 1206, otherwise, processing continues to block 1212 (FIG. 12B).

In block 1206, the multiple incremental virtual copies process 116 performs a source cache scan to identify modified source data blocks for this source volume. In block 1208, for each modified source data block and for each cross-cluster incremental virtual copy relationship for which the modified source data block in source cache is newer than the cross-cluster incremental virtual copy relationship, the multiple incremental virtual copies process 116 updates the target inheritance structure for those relationships to indicate that the source data block has not been copied from the source yet. From block 1208 (FIG. 12A), processing continues to block 1210 (FIG. 12B).

In block 1210, the multiple incremental virtual copies process 116 merges the target change recording structure 310 with the target inheritance structure 300. In block 1212, the multiple incremental virtual copies process 116 updates the relationship manager 118 to indicate the new incremental virtual copy operation. Updating the relationship manager 118 sets the timestamp or a generation number for the incremental virtual copy relationship. In block 1214, the multiple incremental virtual copies process 116 allows I/O on the source and target volumes to proceed.

If there are a large number of incremental virtual copy targets, then the solution for same cluster targets may hold the write for a long period of time and impact response time for writes to incremental virtual copy source. In certain embodiments, to overcome this problem, when there are large number of incremental virtual copy targets, then the same cluster targets may be treated like cross-cluster copy targets (i.e. the target change recording structure is updated for the same cluster targets during destage of the source data blocks and during flash or increment by running a source cache 124 scan for modified data blocks on the source volume.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

FIG. 13 illustrates a computer architecture 1300 that may be used in accordance with certain embodiments. Storage controller 100 and/or hosts 150a, b, . . . k may implement computer architecture 1300. The computer architecture 1300 is suitable for storing and/or executing program code and includes at least one processor 1302 coupled directly or indirectly to memory elements 1304 through a system bus 1320.

The memory elements 1304 may include local memory employed during actual execution of the program code, bulk storage, and cache memories which provide temporary storage of at least some program code in order to reduce the number of times code must be retrieved from bulk storage during execution. The memory elements 1304 include an operating system 1305 and one or more computer programs 1306.

Input/Output (I/O) devices 1312, 1314 (including but not limited to keyboards, displays, pointing devices, etc.) may be coupled to the system either directly or through intervening I/O controllers 1310.

Network adapters 1308 may also be coupled to the system to enable the data processing system to become coupled to other data processing systems or remote printers or storage devices through intervening private or public networks. Modems, cable modem and Ethernet cards are just a few of the currently available types of network adapters 1308.

The computer architecture 1300 may be coupled to storage 1316 (e.g., a non-volatile storage area, such as magnetic disk drives, optical disk drives, a tape drive, etc.). The storage 1316 may comprise an internal storage device or an attached or network accessible storage. Computer programs 1306 in storage 1316 may be loaded into the memory elements 1304 and executed by a processor 1302 in a manner known in the art.

The computer architecture 1300 may include fewer components than illustrated, additional components not illustrated herein, or some combination of the components illustrated and additional components. The computer architecture 1300 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A system, comprising:
a processor; and
a storage device coupled to the processor, wherein the storage device stores a computer program, and wherein the processor executes the computer program to perform operations, the operations comprising:
in response to establishing each incremental virtual copy from a source to a target, creating a target change recording structure on the target; and
while performing destage to a source data block at the source,
for each incremental virtual copy relationship where the source data block is newer than the incremental virtual copy relationship and an indicator is set in a target inheritance structure on the target for a corresponding target data block, wherein the target inheritance structure indicates which data blocks on the target are to be copied from the source,
copying the source data block to each corresponding target data block; and
setting an indicator in each target change recording structure on each target for the target data block corresponding to the source data block being destaged.

2. The system of claim 1, wherein the operations further comprise:
in response to receiving a subsequent incremental virtual copy,
merging the target change recording structure with the target inheritance structure to indicate source data blocks that are to be copied to corresponding target data blocks;
performing a destage scan synchronous to the subsequent incremental virtual copy on the source; and
updating a relationship manager to indicate the subsequent incremental virtual copy.

3. The system of claim 1, wherein the operations further comprise:
in response to receiving a write to a target data block that is in an incremental virtual copy relationship, setting an indicator for the target data block in the target change recording structure for the target to indicate that a corresponding source data block is to be copied to the target data block on a subsequent incremental virtual copy.

4. The system of claim 1, wherein the operations further comprise:
in response to receiving a read to a target data block,
in response to determining that an indicator is set in the target inheritance structure on the target for the target data block, determining that a corresponding source data block has been modified in source cache, and determining that the modified source data block is older than an incremental virtual copy relationship or part of the incremental virtual copy relationship with the target data block,
destaging the modified source data block; and
synthesizing the target data block from the source data block by reading from the source.

5. The system of claim 1, wherein the operations further comprise:
storing a cross cluster indicator; and
in response to receiving a subsequent incremental virtual copy and determining that the cross cluster indicator is set to indicate that the source and target are in different clusters, performing a source cache scan to identify modified source data blocks for the source; and
for each modified source data block and for each cross-cluster incremental virtual copy relationship for which the modified source data block in source cache is newer than the cross-cluster incremental virtual copy relationship, updating a target inheritance structure to indicate that the source data block has not been copied from the source yet.

6. The system of claim 1, wherein the operations further comprise:
in response to receiving a write to a source data block,
for each incremental virtual copy relationship for which the source and the target are on a same cluster, setting an indicator in the target change recording structure on the target for a target data block corresponding to the source data block which is being written.

7. The system of claim 1, wherein the operations further comprise:
while performing destage to a source data block when the source and target are in different clusters, identifying incremental virtual copy relationships where the source data block is newer than the incremental virtual copy relationship; and
for the identified relationships, for each target inheritance structure for the cross-cluster incremental virtual copy relationship that has an indicator that is not set for a corresponding target data block, setting an indicator in the target change recording structure on the target for the target data block corresponding to the source data block being destaged.

8. A computer program product comprising a computer readable storage medium including a computer readable program, wherein the computer readable program when executed by a processor on a computer causes the computer to perform:
in response to establishing each incremental virtual copy from a source to a target, creating a target change recording structure on the target; and while performing destage to a source data block at the source,
for each incremental virtual copy relationship where the source data block is newer than the incremental virtual copy relationship and an indicator is set in a target inheritance structure on the target for a corresponding target data block, wherein the target inheritance structure indicates which data blocks on the target are to be copied from the source,
copying the source data block to each corresponding target data block; and
setting an indicator in each target change recording structure on each target for the target data block corresponding to the source data block being destaged.

9. The computer program product of claim 8, wherein the computer readable program when executed by the processor on the computer causes the computer to perform:
in response to receiving a subsequent incremental virtual copy,
merging the target change recording structure with the target inheritance structure to indicate source data blocks that are to be copied to corresponding target data blocks;
performing a destage scan synchronous to the subsequent incremental virtual copy on the source; and
updating a relationship manager to indicate the subsequent incremental virtual copy.

10. The computer program product of claim 8, wherein the computer readable program when executed by the processor on the computer causes the computer to perform:
in response to receiving a write to a target data block that is in an incremental virtual copy relationship, setting an indicator for the target data block in the target change recording structure for the target to indicate that a corresponding source data block is to be copied to the target data block on a subsequent incremental virtual copy.

11. The computer program product of claim 8, wherein the computer readable program when executed by the processor on the computer causes the computer to perform:
in response to receiving a read to a target data block,
in response to determining that an indicator is set in the target inheritance structure on the target for the target data block, determining that a corresponding source data block has been modified in source cache, and determining that the modified source data block is older than an incremental virtual copy relationship or part of the incremental virtual copy relationship with the target data block,
destaging the modified source data block; and
synthesizing the target data block from the source data block by reading from the source.

12. The computer program product of claim 8, wherein the computer readable program when executed by the processor on the computer causes the computer to perform:
storing a cross cluster indicator; and
in response to receiving a subsequent incremental virtual copy and determining that the cross cluster indicator is set to indicate that the source and target are in different clusters, performing a source cache scan to identify modified source data blocks for the source; and
for each modified source data block and for each cross-cluster incremental virtual copy relationship for which the modified source data block in source cache is newer than the cross-cluster incremental virtual copy relationship, updating a target inheritance structure to indicate that the source data block has not been copied from the source yet.

13. The computer program product of claim 8, wherein the computer readable program when executed by the processor on the computer causes the computer to perform:
in response to receiving a write to a source data block,
for each incremental virtual copy relationship for which the source and the target are on a same cluster, setting an indicator in the target change recording structure on the target for a target data block corresponding to the source data block which is being written.

14. The computer program product of claim 8, wherein the computer readable program when executed by the processor on the computer causes the computer to perform:
while performing destage to a source data block when the source and target are in different clusters, identifying incremental virtual copy relationships where the source data block is newer than the incremental virtual copy relationship; and
for the identified relationships, for each target inheritance structure for the cross-cluster incremental virtual copy relationship that has an indicator that is not set for a corresponding target data block, setting an indicator in the target change recording structure on the target for the target data block corresponding to the source data block being destaged.

* * * * *